April 14, 1931.  A. ANDERSON  1,801,132
BORE HOLE SURVEYING APPARATUS
Filed Aug. 28, 1924  4 Sheets-Sheet 1
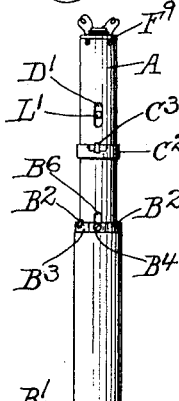
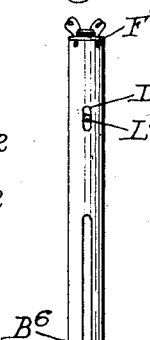
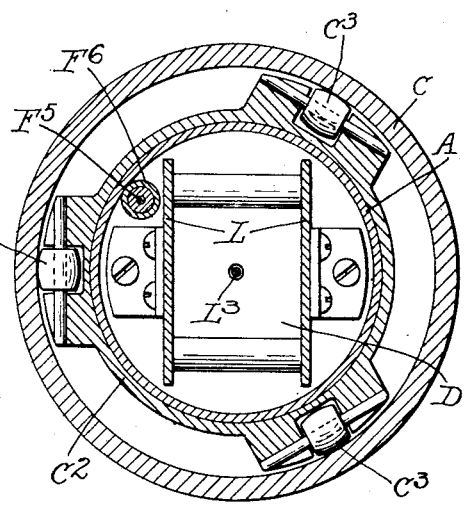
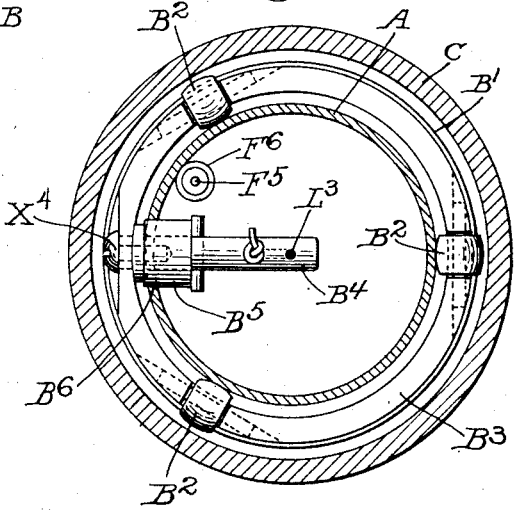
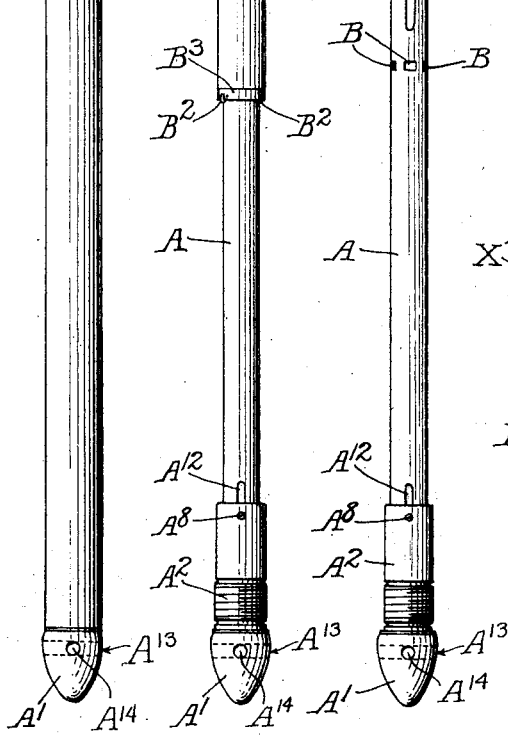
Inventor.
Alexander Anderson,
by Parker + Carter
Attorneys.

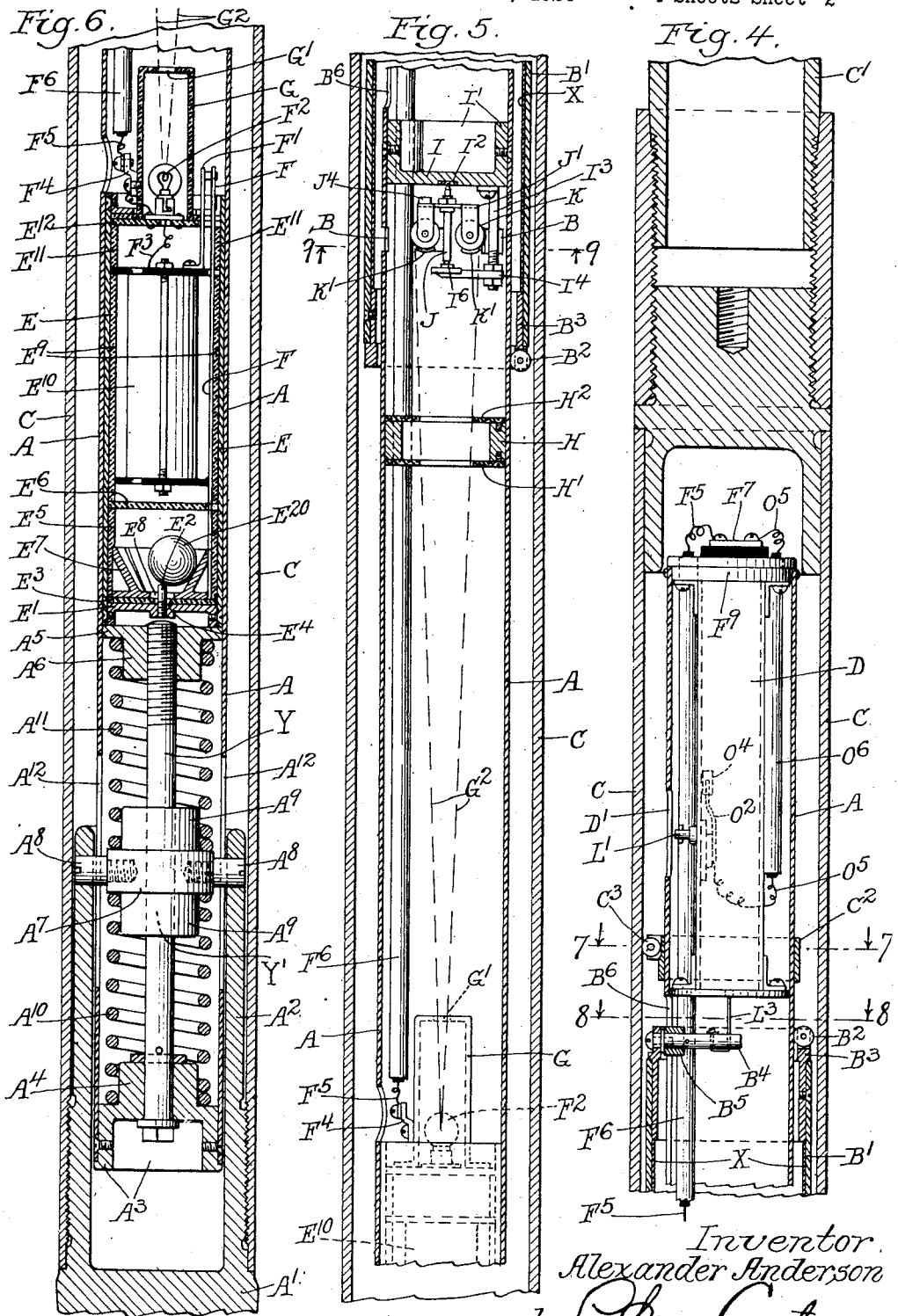

April 14, 1931.   A. ANDERSON   1,801,132
BORE HOLE SURVEYING APPARATUS
Filed Aug. 28, 1924   4 Sheets-Sheet 3
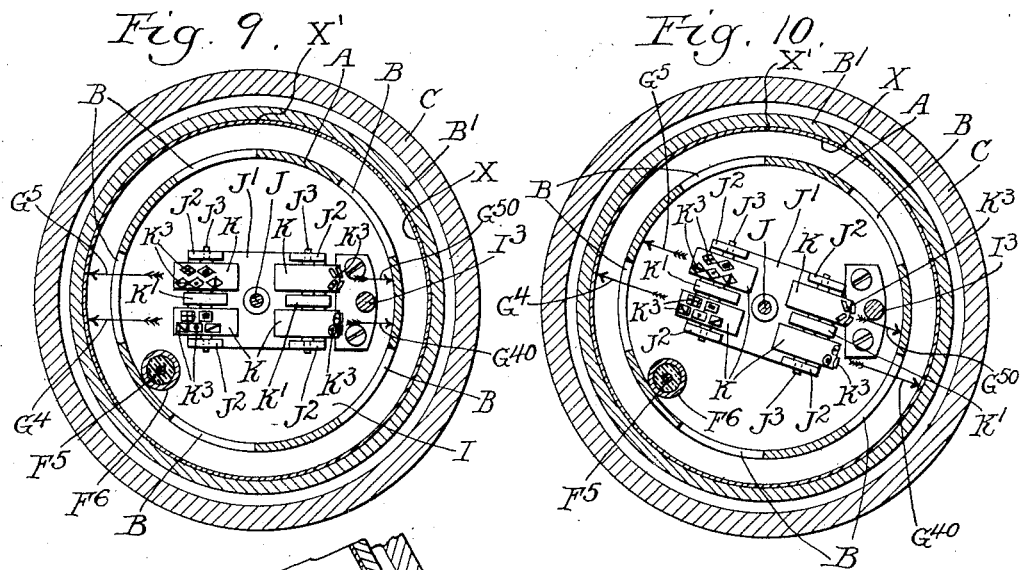
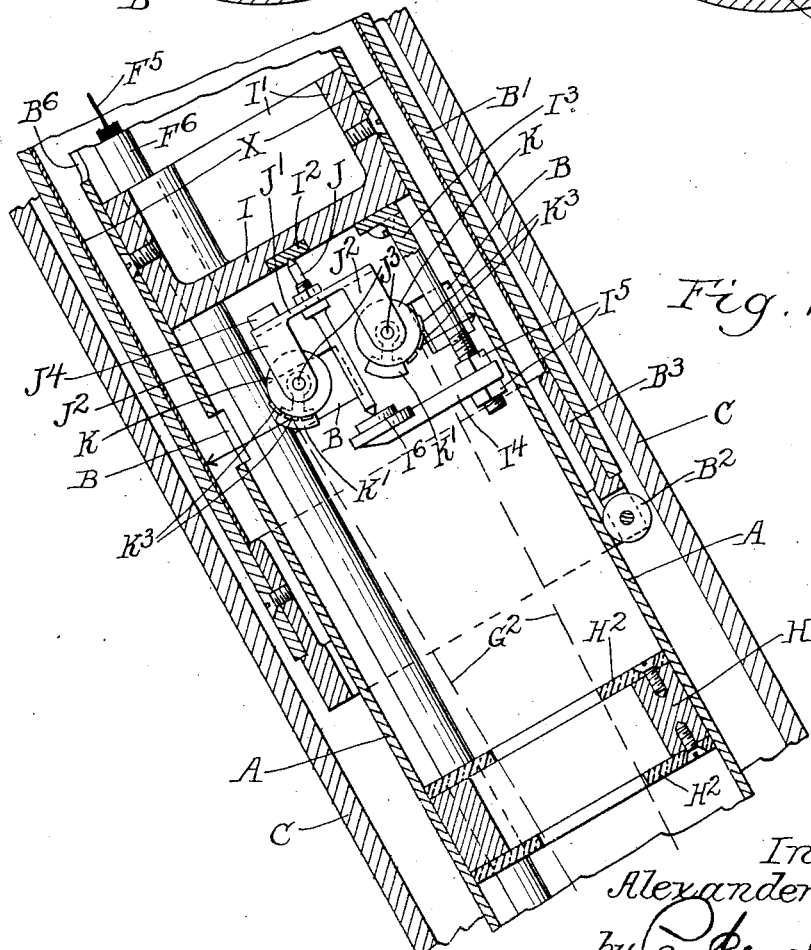
Inventor.
Alexander Anderson
by Parker + Carter
Attorneys.

April 14, 1931.    A. ANDERSON    1,801,132
BORE HOLE SURVEYING APPARATUS
Filed Aug. 28, 1924    4 Sheets-Sheet 4
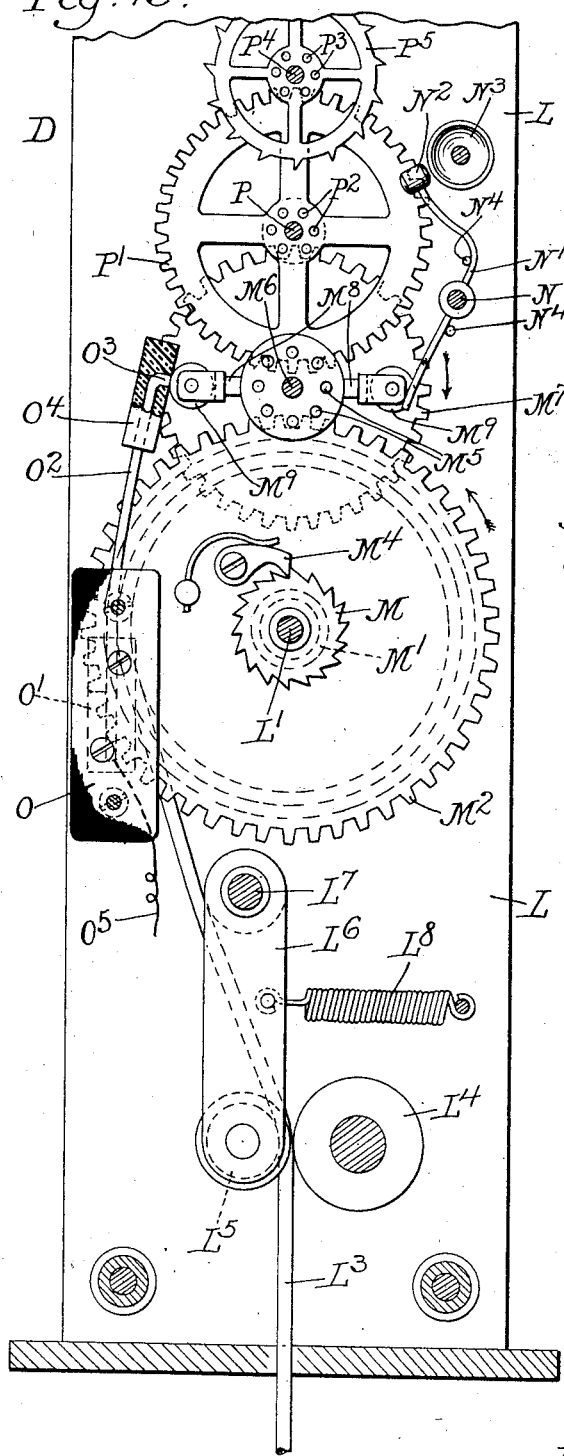
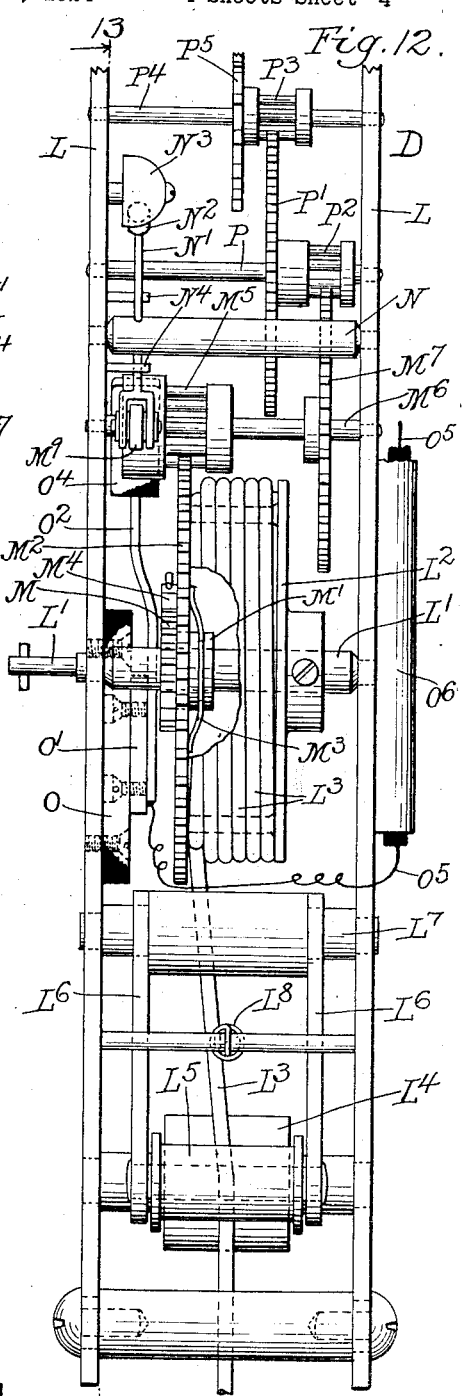
Inventor.
Alexander Anderson.
by Parker + Carter
Attorneys.

Patented Apr. 14, 1931

1,801,132

UNITED STATES PATENT OFFICE

ALEXANDER ANDERSON, OF FULLERTON, CALIFORNIA

BORE-HOLE-SURVEYING APPARATUS

Application filed August 28, 1924. Serial No. 734,577.

This invention relates to the surveying of bore holes, such for example, as an oil well. It should be understood that my invention is not limited to use for surveying oil wells but may be used wherever it is desired to know the inclination of a hole from a given line. In the following description I will describe my invention in the form of an apparatus suited for oil well use but do not wish to be limited thereby.

One object of my invention is to provide an apparatus for accurately ascertaining the amount of inclination and direction of inclination of a bore hole.

Another object of the invention is to provide a survey device in which images are reflected onto a light sensitive film.

Other objects and the particular advantages of the invention will be made manifest in the following specification.

The device of the present invention is designed to be run into the bore hole attached to a line of pipe or rods or other means. It may be used in connection with an apparatus for determining the orientation of the line of pipe as it is passed into the bore or for determining the orientation of the device itself as is fully disclosed in my co-pending application, Ser. No. 732,145, filed August 15, 1924, Patent No. 1,770,224; or it may be used in conjunction with any means for determining the orientation of the device. When it is used in conjunction with an orienting means a complete record of the inclination and direction of inclination of the parts of the bore may be obtained during a single surveying operation.

The invention is illustrated more or less diagrammatically in the accompanying drawings wherein—

Figure 1 is a side elevation of my apparatus in its complete form in which it is ready to be lowered into a bore hole;

Figure 2 is a similar view with the outer casing removed and showing in place the film retaining tube;

Figure 3 is a view similar to Figure 2 with the film tube and a collar removed;

Figures 4, 5 and 6 taken together in the order mentioned form a longitudinal sectional view of Figure 1 on an enlarged scale;

Figure 7 is a lateral cross section taken on line 7—7 of Figure 4;

Figure 8 is a similar view taken on line 8—8 of Figure 4;

Figure 9 is a cross sectional view taken on line 9—9 of Figure 5, and showing the mirror carrying parts;

Figure 10 is a similar view showing the parts moved as would be the case during an actual surveying;

Figure 11 is a longitudinal sectional view showing generally the upper part of the device as shown in Figure 5, but on an enlarged scale, and showing the device in inclined position, such as it would take during surveying;

Figure 12 is a side elevation of the clock mechanism; and

Figure 13 is a section taken on the line 13—13 of Figure 12.

Like parts are illustrated by like characters throughout the drawings and specification.

The mechanism of my surveying instrument is, to a large degree, assembled within an inner steel tubing $A$. This tubing and the mechanism carried within it, is flexibly supported upon a bottom head member $A^1$. This head member is provided with an enlarged point and a reduced threaded upwardly extending shaft $A^2$. Mounted within the bottom end of the tube $A$ is a collar $A^3$ provided with an upwardly extending boss $A^4$. Mounted above this within the tube is a second collar $A^5$ provided with a downwardly extending boss $A^6$. Mounted within the tube is a collar $A^7$ which has trunnions $A^8$ formed upon it, which trunnions are journaled in the upwardly extending portion $A^2$. At either side of the collar $A^7$ are bosses $A^9$. Mounted below the collar $A^7$ is a helical spring $A^{10}$ which engages at its lower end the boss $A^4$ and at its upper end one of the bosses $A^9$. Mounted above the collar $A^7$ is a second helical spring $A^{11}$ which, at its lower end, engages one of the bosses $A^9$ and at its upper end engages the boss $A^6$. The tube $A$ is slotted at $A^{12}$ to permit passage of the trunnions $A^8$. The tube $A$ and its contents are carried by the two springs $A^{10}$ $A^{11}$ which exert pressure against the collars $A^3$ and $A^5$. When the apparatus is subjected to the end shocks that are incident to the use of the device when it is moved into a hole, the flexibility of the spring permits cushioning by allowing movement of the tube A within the outer casing C. During these movements the axially situated bolt Y slides in the axially located hole Y' of the fixed collar $A^7$.

Any rotation of the tube A is prevented by the slots $A^{12}$ through which the trunnions $A^8$ project. The rollers $C^3$ situated toward the upper end of the tube A roll on the inside of the outer casing C during these cushioning movements.

The tube A is provided above the slots $A^{12}$ with a plurality of openings B. Through these openings light may be reflected in a manner later to be described. $B^1$ is a tube surrounding the tube A and supported upon it by means of rollers $B^2$, $B^2$ which are carried in collars $B^3$, $B^3$, one at each of its ends. This tube in the form shown is opaque, being preferably made of some insulating material. Within it and extending about its interior is a photographic film X or sheet of sensitized paper which sensitized record member X fits within the cylindrical inner surface of the carrier tube B1 and thus forms in effect a lining for it. The edges of the sheet X meet along one side of the tube B1 as shown at X1 in Figures 9 and 10. The junction point X1 of the edges of the sheet is preferably situated as shown in the drawings in known angular relation to the aligning openings $A^{13}$ and $A^{14}$ which appear particularly in Figures 1, 2 and 3. Upon this film or paper is received the light by means of which the survey record is made. The details of this will be explained later. The tube itself might be transparent. It might be of glass, and in that case the film or sheet of paper will be wrapped about its exterior. The tube $B^1$ is supported by a line from a clock situated above it. Fixed in the upper collar $B^3$ is a shaft $B^4$ upon which is mounted a roller $B^5$. This roller lies within a slot $B^6$ in the tube A, and as the tube $B^1$ is raised and lowered, rotation of the tube B1 relative to the tube A is prevented by the shaft B4 and the roller B5 which project within the slot B6. Rotation of the tube A relative to the bottom member A1 is also prevented by means described above. As a result of this construction the tube B1 and the record member X are, in the form of the invention shown herewith, normally maintained in a permanent orientation with regard to the bottom head member A1, the outer casing C, the aligning openings A13 and A14 and other attached parts such for example, as the pipe or other supporting or carrying member C1.

Surrounding the tubes A and $B^1$ and screwed on to the threaded portion $A^2$ of the head $A^1$ is an inclosing and protecting outer casing C. To the upper end of this casing C when the device is used, that is, when the device is therefore prepared for insertion into a bore hole, the bottom end of a stand of pipe $C^1$ may be secured. $C^2$ is a collar fixed about the tube A toward its upper end, and carries rollers $C^3$. The latter rollers, constitute an antifriction bearing between the inner casing A and the outer casing C to minimize frictional resistance to such axial movement of the casing A within the casing C as is permissible in view of the spring mounting arrangement already described. Within the upper end of the tube A is mounted a clock mechanism D which will be described below. Adjacent the upper end of the tube A is an opening $D^1$ through which the stem $L^1$ of the clock D may be wound.

Located within the tube A and near the spring mounting arrangement described above, is a lighting device. First there is mounted within the tube A a tube E, preferably of brass. Within this, at its lower end, is mounted a brass disc $E^1$ in which is fixed a pin, preferably also of brass, $E^2$. Surrounding this pin $E^2$ and resting upon the disc $E^1$ is an insulating disc $E^3$ which may be formed of any insulating material and is spaced away, and is provided with a perforation $E^4$ which is larger than the diameter of the pin $E^2$ and out of contact with it. Within the tube E and resting upon the insulating disc $E^3$ is an insulating tube $E^5$. Above this is an insulating disc $E^6$ which is fixed in position within the brass tube E and serves to hold the tube $E^5$ in place. Located within the tube $E^5$ and resting upon the disc $E^3$ is a brass or other metallic cup $E^7$. It is provided with a perforation $E^8$ which surrounds, is larger than, and out of contact with the pin $E^2$. This pin extends into the cup. Loosely resting within the cup is a metallic ball $E^{20}$. When the surveying device is generally vertical, the ball will occupy the position shown in Figure 6 and will make a contact between the pin $E^2$ and the cup $E^7$. When the apparatus is lowered from the vertical to a generally horizontal position, the ball rolls out of the cup and no longer forms a contact between the cup and the pin. $E^9$ is an insulating tube located within the brass tube E and resting upon the insulating disc $E^6$. Within it is mounted a battery $E^{10}$. Above the tube $E^9$ is another insulating tube $E^{11}$ and on the top of this is an insulating disc $E^{12}$.

F is a conductor fastened at one end to the cup and joined at the other to a second conductor, $F^1$, which is fastened to one pole of the battery. When the ball is in the position shown in Figure 6, a contact is made by means of which the conductor F is grounded on the pin $E^2$ which is held in the brass disc $E^1$ and is itself grounded, on the metallic tube E which is in contact with the metallic tube A. Mounted upon the insulating disc $E^{12}$ is an electric light $F^2$. One conductor $F^3$ of the light $F^2$ is connected to the battery. Another conductor through a fitting $F^4$ is joined to an insulated conductor $F^5$ which leads upward in the tube $F^6$ to the clock, where it is fastened to the plate $F^7$ which is carried on a metallic cap $F^9$, the plate $F^7$ being insulated from said cap. The metallic cap $F^9$ is joined to the metallic tube A and closes it. Opposite the fitting $F^4$ is an opening in the tube A through which the connection between the fitting $F^4$ and the conductors $F^5$ may be conveniently made.

Surrounding the light $F^2$ is a tubular light trap G. It is provided in its upper end with a limited circular opening $G^1$. By means of this light trap the light rays which are directed upward from the light are limited to a comparatively narrow beam $G^2$.

Located within the tube A and above the light trap above mentioned may be a second light trap which is formed of a ring H fastened in the tube A. Above and below this ring and fastened to it are perforated discs $H^1$ and $H^2$. These discs with their limited perforations serve further to restrict the path of the rays of light from the light source as shown.

Fixed within the tube A, preferably a little above the openings B through it, is a supporting disc I having an extended flange $I^1$ by means of which it is fastened into the tube A. A bearing $I^2$ is provided in the part I. Downwardly extending from the disc I is a shaft or rod $I^3$ to which a bearing supporting arm $I^4$ is adjustably attached by means of nuts $I^5$, $I^5$. Mounted on the end of the arm $I^4$ is a bearing $I^6$. This bearing is in line with the bearing $I^2$ and the two bearings are aligned with the central axis of the surveying device. Supported at either end by the bearings $I^2$ and $I^6$ is a shaft J. Fastened on this shaft and adapted to move with it is a supporting frame member $J^1$. This frame $J^1$ has preferably downwardly depending from it two pairs of arms $J^2$, $J^2$ in which shafts $J^3$, $J^3$ are journaled. $J^4$ is a weight mounted on the frame member $J^1$ and adapted when the surveying apparatus is tilted to move downward as is shown in the Fig. 11. This weight thus causes the frame member $J^1$ to rotate to always bring the weight on the lower side.

Fixed on each of these shafts are two symmetrical rollers K, K. Fixed also on each of the shafts is an unsymmetrical or out of balance weight $K^1$, $K^1$. These weights tend normally to hold the shafts $J^3$ and the rollers upon them in a fixed position. As the surveying device is tilted, however, the weights, tending always to hang straight down, rotate the shafts upon which they are fixed. On each of the rollers K is mounted a number of small mirrors or other light reflecting parts $K^3$. These parts are of varying size and shape, and each casts a distinctive reflected beam, the beam of light being projected from the light source upward through the light traps, striking the mirror or reflecting devices on the roller and being reflected laterally from some of them through the openings B and so upon the film or other light sensitive record member, and making an impression thereon. On the left hand rollers K, as shown in Fig. 11, the mirrors need only run downward from the first mirror which reflects horizontally, and on the right hand, rollers K, as shown in this figure, need run only upward through an arc from the zero mirror. This arrangement is made possible because the weight $J^4$ causes the frame member $J^1$ always to rotate toward a given position and because the mirrors on the left hand rollers K are on the same side as the weight $K^1$ on that roller, while the mirrors on the right hand rollers K are on the opposite side of the rollers K from the weight $K^1$ on that set of rollers. Thus whatever the angle of inclination of the surveying apparatus, the beam of light projected upwardly from the light source will strike the mirrors on each set of rollers and from some of them be deflected laterally.

The clock mechanism, which has been previously designated generally by the letter D, will now be described in detail. The mechanism is mounted between two frame members L, L and constitutes generally a clock of the usual known type. Only such details as are modified from the usual practice will be described herein. $L^1$ is a shaft provided with a projection at one end so that it may be rotated in a clockwise direction to wind the line $L^3$ upon the drum $L^2$. This line may be of gut or other suitable material and extends downwardly from the clock and is fastened to the pin or rod $B^4$ which is itself fastened to the film carrying tube $B^1$. The weight of the film carrying tube and film causes it to move downward within the tube A, guided in the slot $B^6$ by the roller $B^5$ lying therein. This weight acting on the drum $L^2$ also drives the clock. The clock regulates the rate of travel of the film past the apertures B, B of the tube A. The line $L^3$ passes between a roller $L^4$ on a fixed shaft and the roller $L^5$ which is carried between a pair of pivoted arms $L^6$ which are fixed to a shaft $L^7$. $L^8$ is a helical spring fastened to the clock frame at one end and at the other end fastened to the pivoted arms $L^6$. This spring serves to hold the roller $L^5$ yieldingly against the roller $L^4$, and thus to prevent accidental upward movement of the line $L^3$; to prevent slack of this line and to hold it normally taut.

M is a ratchet wheel fixed on the hub $M^1$. $M^2$ is a gear mounted on the hub and free to move with relation thereto. $M^3$ is a spring, preferably disc shaped on the hub $M^1$ and tending to hold the gear $M^2$ against the ratchet wheel M. $M^4$ is a pawl fixed on the gear $M^2$ and engaging the ratchet wheel M. The gear $M^2$ meshes with the cage pinion $M^5$ on the shaft $M^6$ which also carries a gear $M^7$. Mounted also on the shaft $M^6$ is a pair of arms $M^8$, $M^8$ which carry in their ends contacting rollers $M^9$, $M^9$.

N is a shaft journaled in the clock frame and carrying a spring lever $N^1$ which is adapted at one end to be contacted by the rollers $M^9$. At its other end it carries a bell clapper $N^2$ which is adapted to contact and ring a bell $N^3$. The lever $N^1$ is limited in its movement by stops $N^4$.

O is an insulation fastened on the clock frame and is provided with a connection plate $O^1$. To this connection plate a spring conductor $O^2$ is fixed. This conductor extends upwardly and is laterally bent as at $O^3$. It carries at its upper end a contact block $O^4$ which is made of insulating material and the laterally bent contact point $O^3$ extends inward to its contact face. As the arms $M^8$ rotate, the rollers $M^9$ successively come in contact with the contact face $O^4$ and move the spring $O^2$ laterally. When they have moved along the contact member $O^4$ sufficiently they make contact with the contact point $O^3$ and thus complete the circuit from this point through the member $O^2$, the member $O^1$ and the conductor $O^5$. $O^6$ is a metal tube which carries the insulated wire $O^5$ from the plate $O^1$ on the insulation O to the plate $F^7$ at the top of the clock.

From the plate $F^7$ the electric circuit passes through the insulated conductor $F^5$ downwardly to the fitting $F^4$ and thence through the filament of the electric lamp $F^2$ to the conductor $F^3$ and the battery $E^{10}$ through the conductors $F^1$ and F to the metal cup $E^7$.

When the metal ball $E^{20}$ is in the position shown in Fig. 6, the circuit passes from the cup $E^7$ through the ball to the pin $E^2$ and thence through the metal disc $E^1$ and metal tube E and steel tube A to the clock frame L, shaft $M^6$, and arms $M^8$ to the contacting rollers $M^9$.

The circuit is completed and the light is flashed by the contacting of one of the rollers $M^9$ with the contact point $O^3$.

P is a shaft journaled in the clock frame and it carries a gear $P^1$ and a cage pinion $P^2$ which is in mesh with the gear $M^7$. The gear $P^1$ meshes with the cage pinion $P^3$ on a shaft $P^4$ journaled on the clock frame. This shaft $P^4$ also carries an escapement wheel $P^5$.

Although I have shown an operative device, still it is obvious that many changes might be made in size, shape and arrangement of parts without departing materially from the spirit of my invention; and I wish, therefore, that my showing be taken as in a sense diagrammatic.

While I have shown the clock mechanism as driven by a weight and have shown the device arranged so that it does not work unless it is in a generally vertical position, it is obvious that many changes might be made from this arrangement. Springs might be used to actuate the clock although in the form shown herewith springs do not appear, and my preferred form is without them. Springs might be used to draw down the film holding tube or to assist gravity in doing so. This would be of particular importance where the hole being surveyed was horizontal or nearly so, as, of course, if the weight alone is used it would stop as the device aproached the horizontal.

The use and operation of my invention are as follows:

The driving force for the clock comes from the downward throw on the cable or gut string which is wound about the drum $L^2$. When the device is not in use it is normally carried in a substantially inverted position and there is then no downward pull on the cable or gut string $L^3$; the clock is not driven, and the parts remain idle. In this position the lower ball $E^{20}$ falls away from the pin $E^2$ and no electrical current can pass. When it is desired to use the device, it is raised to a generally vertical position. Tension is thus brought upon the cord $L^3$ and the clock is set in motion. The ball $E^{20}$ also moves downward into contact with the pin $E^2$ and electrical connections become possible. As the clock is moved and as the contact rollers $M^9$ are moved about due to rotation of the parts which carry them, the bell clapper mechanism is tripped and the bell is sounded. The operator hears this signal and notes that the device is in satisfactory operating order. By reason of the fact that the bell is sounded each time an electrical contact is made, he can time the starting of the device and can know when the light arrangement is flashed.

The operation of the flashing mechanism is as follows: So long as the contact rollers $M^9$ are out of contact with the part $O^3$, the electrical circuit is incomplete and the light is not flashed. As the clock is driven, however, the parts carrying the rollers rotate and thus the rollers successively contact the part $O^3$, complete the electrical circuit and cause the light to flash. This light is flashed upward and falls upon the mirrors carried by the small rollers K. By them it is reflected generally laterally through the openings in the sides of the tube A. The light so reflected passes through the openings and registers on the film within the film carrying tube. Since the mirrors are of distinctive sizes and shapes a distinctive beam is reflected by each of the mirrors and this reflected beam makes a distinctive exposure upon the film. It is obvious, of course, that the angular relation between the movable mirrors and the light source is such that not all of them will reflect through the opening and cause an impression upon the film.

In the form of the invention shown herewith, the light flashed upwards through the light traps is a bright ray of conical form extending between the lines G2 in Fig. 11. Only a very small fraction of this ray is utilized by the operative reflections which are thrown directly onto the film to produce distinctive impressions thereon. The rest of this beam of light is dissipated by reflection and counter reflection from the inoperative mirrors, the rollers, frame, shaft and the interior walls of the tube A beneath the disc I with the result that the whole of the interior of the tube A adjacent to the openings B is brightly illuminated by the diffused light.

The film X is blocked off from this light by the tube A, except at the openings B, where the light passes through and produces an image of each opening on the film, with a slight halo surrounding the margin of each image.

The operative impressions, which are directly reflected and are therefore much stronger than the shadow outlines of the openings, are superposed on these darkened areas and their clearness is not affected by them.

The direction of inclination of the survey apparatus relative to the apparatus itself may be determined as follows:—In the form of apparatus shown in the drawings each flashing of the light produces darkened areas on the record member corresponding to the openings B in the tube A. Certain distinctive operative mirror reflections are also impressed and superposed on one or on more of these darkened areas.

One of the openings B which I will refer to as the zero opening B lies below the slot B6 and on the same center line as the slot.

Fig. 3 shows that a radius drawn from the axis of the tube A outwards through the center line of the slot B6 has the same direction as another similar radius drawn through the center of the zero opening B which lies below the slot, and this direction, which also corresponds with the direction of the axis of the aligning opening A14 as viewed from the back of the paper in Fig. 3, looking towards the reader, is the 0—360 degree direction from which all directions of inclination are measured from left to right.

When the film carrying tube B' is removed from the apparatus after a surveying operation the darkened areas on the film corresponding to the zero opening extend along the film in line with the socket hole X4 for the shaft B4 in the collar B3 at the top of the tube B'.

To determine the direction of inclination of any film reading such as for example the two cases illustrated in Figs. 9 and 10, the film is removed from the tube and is developed (if necessary) and flattened out.

A longitudinal line is then drawn along the film through the centers of the darkened areas corresponding to the successive exposures of the zero opening B. This line is the 0—360 line from which directions are measured across the breadth of the film.

A flashing of the light under conditions such as shown in Fig. 9 is worked out as follows: the film shows two distinctive impressions reflected on it through the same opening. Since in Fig. 9 this opening is the zero opening B which is in line with the slot B6 as shown in Fig. 5 the two impressions clearly fall on different sides of the 0—360 line drawn on the film.

By examining the characteristics of the impressions the actual mirrors from which these reflections were thrown are determined. The standard measurements of the instrument parts as here shown supply the following information about these mirrors:—

(a) Spacing on rollers is 15° from zero mirror.

(b) They belong to the weighted end of the frame J1. Item "a" gives inclination of the apparatus as about 15°. Item "b" indicates that the direction of inclination lies at 180° from the center line of the impressions, because the weighted end of the frame always hangs on the side opposite the direction of inclination. The measurement from the 0—360 line on the film to a point midway between the two images shows this point to be 1° to the right of the line. Adding 180° to this measurement gives the true direction of inclination with reference to the aligning opening A14 as 181°. To work out a survey record made under conditions similar to those of Fig. 10, the inclination and respective positions of the mirrors on the frame are obtained as in the first example.

Measurement from the 0—360 line to each impression gives the following

G4—11° left or say 349°
G40—155° right or say 155°.

Each image is a standard distance of 7° out of center, with the center line of the frame J' and this amount must be subtracted from the direction of G4 and added to that of G40. The resultant bearings are therefore 342° and 162°, the difference between these bearings is 180° and provides a check on both results.

As a reflection G40 was made from a mirror at the un-weighted end of the frame J' the required direction of inclination measured from the zero line of the apparatus is 162°.

As the apparatus is tilted from the vertical the reflections of successive mirrors will assume a lateral direction with respect to the openings B, and before the reflection of one mirror is eclipsed at the top of an opening the reflection of the next mirror will enter the bottom of the opening, or vice versa. In this way there are sometimes one and sometimes two operative reflections cast by mirrors on the same roller. This consideration does not in any way affect the method of obtaining the direction of inclination, but it permits interpolation of vertical angles by inspection after the degree value of the image-forming mirror has been determined.

Instead of measuring directions of inclination from a 0—360° line drawn through the center of the image of the zero opening B; these measurements may be made from the edges of the film X.

As shown in Figures 9 and 10 I indicate two positions of the mirrors. In Figure 9 the rays are indicated by the arrows $G^4$ $G^5$ and by the arrows $G^{40}$ $G^{50}$. As shown in that figure $G^4$ $G^5$ pass through the openings and register upon the film. $G^{40}$ $G^{50}$ do not pass through any of them and therefore make no register. Figure 10 shows a position in which the device has been rotated or tipped so that the long mirror carrying assembly is rotated, and in this position the ray $G^4$ is reflected through the opening and makes an impression on the film. The ray $G^5$ falling upon the solid part of the tube makes no impression on the film. The ray $G^{40}$ which previously fell upon a solid part of the tube now falls opposite an opening and passes through and makes an impression upon the film. The ray $G^{50}$ which in the preceding position was masked and did not make an impression on the film, is again masked and again does not make any impression. Thus the arrangement of the parts is such that they always give the readings on the film, either two reading from adjoining mirror carrying rollers as in Figure 9, or two similar readings from oppositely placed mirror rollers as in Figure 10.

The tube which surrounds the light bulb with the light trap formed of the members $H^1$ $H^2$ serves to prevent the beam of light from striking directly upon the inner sides of the tube A and thus set up uncontrolled and irregular reflections which might be reflected upon the mirrors and from them reflected irregularly through the openings so as to cause incorrect registering on the film. The arrangement of the light trap and tube is such that the rays which fall upon the mirrors are unreflected and pass directly from the light source to the mirrors.

Since the variation in the tilting of the surveying instrument brings different mirrors into play so as to cause the light from the light source to be reflected from different mirrors in response to variations in the angular position of the surveying apparatus, it is possible when the parts are measured and their proportions and normal angular relations understood, to tell the angle of inclination of the device at the time that a given photographic impression is made. Because some of the light rays as they are reflected from the mirrors are blocked off, as for example in Figures 9 and 10 where they strike solid portions of the tube, it is possible to tell from the impression made upon the film not merely the degree of inclination but also its direction of inclination relative to the apparatus; and by means, therefore, of this mirror and light flashing arrangement used in connection with means for determining the orientation of the pipe to which the present apparatus may be attached, it is possible to tell from the photographic impression the degree and direction of inclination of the bore hole at the point where the light was flashed so as to cause a particular impression. And from a series of such readings a complete survey of the hole can be built up and the complete and exact degree and direction of its inclination known and indicated.

I claim:

1. In combination a surveying apparatus a light sensitive record member, a light source, a record making part adapted to direct light upon such record member to make a characteristic record at each operative position of the apparatus the record member and the record making part being mounted for transverse movement in response to tilting of the apparatus.

2. In a bore hole surveying apparatus, a light sensitive record member, a light source and a reflecting part, said reflecting part carried upon a movably mounted out of balance carrier, said carrier being movably supported in a second carrier which is mounted for movement.

3. In a bore hole surveying apparatus, a light sensitive record member, a light source and a reflecting part, said reflecting part carried upon a movably mounted out of balance carrier, said carrier being movably supported in a second carrier which is out of balance and mounted for movement.

4. In a bore hole surveying apparatus, a light sensitive record member, a light source, a reflecting part, adapted to reflect light upon such record member, such reflecting part being out of balance and mounted for movement, and being itself carried in an out of balance carrier, the reflecting part and the carrier adapted to move in response to tilting of the apparatus.

5. In a bore hole surveying apparatus, means for recording the degree of inclination of the apparatus, said means including a light source, and a light sensitive record member, a mirror mounted to swing in response to tilting of the apparatus, and which is adapted to receive light from said light source, and to reflect the same upon said light sensitive record member, and means for energizing said light source to make a record upon the said record member.

6. In a bore hole surveying apparatus, means for recording the degree of inclination of the apparatus, said means including a light source, and a light sensitive record member, and a plurality of different swinging mirrors adapted to receive the light from said light source and to reflect the same upon said light sensitive record member, and means for energizing said light source to make a record upon said record member.

7. In a bore hole surveying apparatus, means for recording the degree of inclination of the apparatus, said means including a light source, and a light sensitive record member, and a plurality of different swinging mirrors adapted to receive the light from said light source and to reflect the same upon said light sensitive record member, and means for energizing said light source to make a record upon said record member, said swinging mirrors mounted on an out of balance rotatably mounted member, said member being carried on a movably mounted support.

8. In a bore hole surveying apparatus, means for recording the degree of inclination of the apparatus, said means including a light source, and a light sensitive record member, and a plurality of different swinging mirrors adapted to receive the light from said light source and to reflect the same upon said light sensitive record member, and means for energizing said light source to make a record upon said record member, said swinging mirrors mounted on an out of balance rotatably mounted member, said member being carried on an out of balance movably mounted support.

9. In a bore hole surveying apparatus, a light source and mirrors adapted to reflect light from said source, said mirrors mounted for movement on a pivoted member, said member being balanced so that it tends normally to remain in a fixed position with relation to the horizontal, said member carried in a pivoted frame member which is balanced so that it tends normally to remain in fixed position with relation to the vertical, the pivoted frame member being adapted to rotate about the longitudinal axis of the surveying apparatus as a whole.

10. In a bore hole surveying apparatus, means for recording the degree of inclination of the apparatus, said means including a light source, and a light sensitive record member and a plurality of different swinging mirrors adapted to receive the light from said light source and to reflect the same upon said light sensitive record member, and means self-contained within the apparatus for automatically energizing said light source to make a record upon said record member.

11. In a bore hole surveying apparatus, means for recording the degree of inclination of the apparatus, said means including a light source, and a light sensitive record member, and a plurality of different swinging mirrors adapted to receive the light from said light source and to reflect the same upon said light sensitive record member, and means self-contained within the apparatus for repeatedly energizing said source to make a record upon said record member.

12. In a bore hole surveying apparatus, means for recording the degree of inclination of the apparatus, said means including a light source, and a light sensitive record member, and a plurality of different swinging mirrors adapted to receive the light from said light source and to reflect the same upon said light sensitive record member, and means self-contained within the apparatus for energizing said light source to make a record upon said record member, said swinging mirrors being mounted on an out of balance rotatably mounted member.

13. In a bore hole surveying apparatus adapted to record inclination, a light source, a light sensitive record member, a plurality of different swinging mirrors adapted to receive the light from said light source and to reflect the same upon said light sensitive record member, and means for periodically and automatically energizing said light source to make a record upon said record member, said swinging mirrors being mounted on an out of balance rotatably mounted member carried by a frame member, said frame member being mounted to rotate about the central longitudinal axis of said surveying apparatus.

14. In a bore hole surveying apparatus, means for recording the degree of inclination of the apparatus, said means including a light source, a light sensitive record member and a plurality of different swinging mirrors adapted to receive the light from said light source and to reflect the same upon said light sensitive record member, and means for energizing said light source to make simultaneously a plurality of distinctive records.

15. In combination a surveying apparatus, a light sensitive record member, a light source, a record making part adapted to direct light upon such record member to make a characteristic record at each operative position of the apparatus and an opaque shield adapted to limit the number of records received upon said record member.

16. In combination a surveying apparatus, a light sensitive record member, a light source, a record making part adapted to direct light upon such record member to make a characteristic record at each operative position of the apparatus and an opaque shield adapted to limit the number of records received upon said record member such opaque shield having an aperture adapted to control the number and character of the records received upon said light sensitive member.

17. In a bore hole surveying apparatus, a light source, a light sensitive record member and means for energizing said light source to make a record upon said light sensitive member, a plurality of swinging reflecting members adapted to reflect light from said light source upon said light sensitive record member, and an opaque shield for limiting the number of reflections received upon said light sensitive member.

18. In a bore hole surveying apparatus, a light source, a light sensitive record member and means for energizing said light source to make a record upon said light sensitive member, a plurality of swinging reflecting members adapted to reflect light from said light source upon said light sensitive record member, and an opaque shield having an aperture said aperture being positioned to limit the reflections received on said record member to those reflections which fall substantially in a plane.

19. In a bore hole surveying apparatus, a light source, a light sensitive record member and means for energizing said light source to make a record upon said light sensitive member, and an opaque shield having an opening adjacent to said light sensitive record member and adapted to permit light to fall thereon, whereby an outline of said opening is recorded, such outline providing means for orienting other records on the light sensitive member.

20. In a bore hole surveying apparatus, a light source, a light sensitive record member and means for energizing said light source to make a record upon said light sensitive member, a plurality of swinging reflecting members adapted to reflect light from said light source upon said light sensitive record member, and an opaque shield having an aperture positioned to limit the reflections received on said record member.

21. In a bore hole surveying apparatus, a light sensitive record member, a light source, means for energizing said light source and a plurality of reflecting elements adapted to reflect light on said light sensitive member, said reflecting elements being carried on a member supported for movement on a pivot and arranged in such manner that when the apparatus is in any operating position one of the reflecting elements is positioned to reflect a ray of light in a direction which is substantially parallel with the plane of a cross section of the apparatus.

22. In a bore hole surveying apparatus, a light sensitive record member, a light source, means for energizing said light source, a plurality of reflecting elements adapted to reflect light on said light sensitive member, and an opaque shield providing an opening, said reflecting elements being carried on a member supported for movement on a pivot and arranged in such manner that when the apparatus is in any operating position one of the reflecting elements is positioned to reflect a ray of light through said opening.

23. In a bore hole surveying apparatus, an inclination recording device and a light sensitive record member, a light source and means for moving said record member and for energizing said light repeatedly, a light and water impervious casing enclosing all of said parts said apparatus adapted to remain inoperative indefinitely, and said light energizing means and said record member adapted to be initially set in motion by movement of said apparatus as a whole.

24. In a bore hole surveying apparatus, a light sensitive record member, a light and energy source therefor and a mechanism adapted to cause said light to be energized repeatedly, a control element adapted to prevent the operation of the light and adapt to be moved by movement of the machine as a whole to permit operation of the light, and a driving means for said light operating mechanism adapted to have its driving movement initiated by movement of the apparatus as a whole.

25. In combination, in a bore hole surveying apparatus, a light sensitive record member, a light source, means for causing said light to light, and an opaque cylindrical shield said shield having apertures adapted to control the number and character of records received upon said record member.

26. In a bore hole survey instrument consisting of a closed self-contained unit to be advanced in a boring and to automatically and serially record the changes in inclination of the instrument at a series of consecutive positions along the bore, comprising a light source, a reflecting element mounted to swing as the instrument is tilted, and a sensitized record strip, the reflecting element being positioned and operative to reflect light rays from the said source on to the record strip so that a record is made upon the said strip with each energization of the light source, and time controlled mechanism also contained within said unit to periodically energize the light source whereby a serial record may be made.

27. In a bore hole survey instrument consisting of a closed self-contained unit to be advanced in a boring and to automatically and serially record the changes in inclination of the instrument, comprising a light source, a reflecting element mounted to swing as the instrument is tilted, and a sensitized record strip, means for feeding the record strip relative to the light source, the reflecting element being positioned and operative to reflect light rays from the said source on to the record strip so that a record is made upon the said strip with each energization of the light source, and time controlled mechanism also contained within said unit to repeatedly energize the light source whereby a serial record is made.

28. In a bore hole survey instrument consisting of a closed self-contained unit adapted to be advanced in a bore and to automatically and serially record the changes in inclination of the instrument at successive points along the bore, comprising an entirely closed outer casing, within which is yieldingly supported the recording mechanism consisting of a light source a reflecting element, and a sensitized record strip, substantially surrounding said reflecting element and supported for movement relative to said light source, said reflecting element being positioned to reflect light upon the record strip and movably supported to permit tilting and rotating relative to the casing and in response to movements thereof, and time controlled mechanism also contained within said casing operative to move the record strip and to periodically energize the light source whereby a serial record may be made.

29. In a bore hole survey instrument consisting of a portable self-contained unit to be advanced in a boring to automatically and serially record the changes in inclination of the instrument at a series of consecutive positions along the bore, comprising a sealed outer casing within which is yieldingly supported a recording mechanism consisting of a light source, a reflecting element, and a sensitized record strip surrounding said reflecting element and supported for movement relative to said light source, said reflecting element being positioned to reflect light from the said light source upon the record strip, an inner casing surrounding the light source and reflecting element and interposed between the said element and the record strip to limit the amount of reflected light passing to the said strip, the reflecting element being mounted on a support for tilting and rotative movement relative to the casing and in response to movements thereof, and means within said casing operative to move the record strip and to periodically energize the light source whereby a serial record may be made.

30. In a bore hole survey instrument consisting of a portable self-contained unit to be advanced in a boring to automatically and serially record the changes in inclination of the instrument at a series of consecutive positions along the bore, comprising a sealed outer casing within which is yieldingly supported a recording mechanism consisting of a light source, a reflecting element, and a sensitized record strip secured to the inner side of a sleeve surrounding said reflecting element and supported for guided rectilinear movement relative to said light source, said reflecting element being positioned to reflect light from the said light source upon the record strip, an inner casing surrounding the light source and reflecting element and interposed between the said element and the record strip to limit the amount of reflected light passing to the said strip, the reflecting element being mounted on a support for tilting and rotative movement relative to the casing and in response to movements thereof, and means within said casing operative to move the record strip and to periodically energize the light source whereby a serial record may be made.

31. In a bore hole surveying apparatus an inclination recording assembly comprising, a light sensitized record member, a light source, a record making part adapted to direct light upon such record making member to make a characteristic record indicative of inclination at each operative position of the apparatus, said record making part being carried upon the moveably mounted, out-of-balance carrier for said record making part, and mounted to change its position with respect to said light sensitive record member in response to tilting of the apparatus.

32. In a bore hole surveying apparatus an inclination recording assembly comprising a light sensitized record member, a light source, a record making part adapted to direct light upon such record making member to make a characteristic record indicative of inclination at each operative position of the apparatus, said record making part being carried upon a moveably mounted, out-of-balance carrier, and mounted to change its position with respect to said light sensitive record member in response to tilting of the apparatus, an energizing means for said light source, an operating means therefor adapted to automatically and periodically energize said light source to make a series of consecutive characteristic records indicative of inclination on said light sensitive member.

33. In combination a surveying apparatus comprising a light sensitive record member, a light source, a record making part supported for tilting and rotating movement relative to the apparatus, and in such relative position to direct light from any operative position that it may take upon such record member, the record making part comprising a plurality of different shape reflectors secured on the outer surface of a swinging element, one or more of the reflectors being adapted to make a characteristic record corresponding to each operative position, and an opaque shield adapted to limit the number of records received upon said record member.

34. In combination a surveying apparatus comprising a light sensitive record member, a light source, a record making part supported for tilting and rotating movement relative to the apparatus, and in such relative position to direct light from any operative position that it may take, upon such record member, the record making part comprising a plurality of different shape reflectors secured on the outer surface of swinging elements symmetrically arranged around the central axis of the apparatus, one or more of the reflectors being adapted to make a characteristic record corresponding to each operative position, and an opaque shield adapted to limit the number of records received upon said record member.

35. In bore hole surveying apparatus for recording inclinations of a boring, comprising an elongated casing to be passed into a boring and containing a light source element, a light reflecting element, and a light-sensitive recording element, the reflecting element being adapted to direct a beam of light from said source upon said record element, and means including said elements responding to tilting of the apparatus to make a record corresponding to the degree of said tilting.

36. In bore hole surveying apparatus for recording inclinations of a boring, comprising an elongated casing to be passed into a boring and containing a light source element, a light reflecting element, and a light-sensitive recording element operative to receive a plurality of spaced records, the reflecting element being adapted to direct a beam of light from said source upon said record element, and means including said elements responding to tilting of the apparatus to direct a characteristic beam of light, upon the record element corresponding to the degree of tilting of the apparatus at each of a series of successive operative positions of the apparatus within a boring.

37. In bore hole surveying apparatus for recording inclinations of a boring, comprising an elongated casing to be passed into a boring and containing a light source element, a light reflecting element, and a light-sensitive recording element, the reflecting element being adapted to direct a beam of light from said source upon said record element, the reflecting element and the recording element being mounted for transverse relative movement in response to tilting of the apparatus to make a record corresponding to the degree of said tilting.

38. In bore hole surveying apparatus for recording inclinations of a boring, comprising an elongated casing to be passed into a boring and containing a light source element, a light reflecting element, and a light-sensitive recording element, the reflecting element being adapted to direct a beam of light from said source upon said record element, the reflecting element and the light source element being mounted for transverse relative movement in response to tilting of the apparatus, to make a record corresponding to the degree of said tilting.

39. In bore hole surveying apparatus comprising the combination of a light source, a light-sensitive record member, and a shield with a light limiting aperture therethrough, the shield being interposed between the light source and the record member, and means including a movably mounted out-of-balance member to effect a characteristic record of light upon the record member in response to tilting of the apparatus.

40. In bore hole surveying apparatus comprising a completely closed outer casing, a recording means, and record operating and controlling means supported within said casing, a record receiving member constituting an element of the said recording means, the said record member being movably supported and maintained in a predetermined rotational position relative to the outer casing, and an aligning means comprising an exterior surface of said casing in known oriented relation with said internally supported record receiving member.

41. In bore hole surveying apparatus for recording inclinations of a boring, comprising an elongated casing to be passed into a boring, a recording means and operating means therefor mounted within said casing, and means responsive to movement of the survey apparatus as a whole to initiate the functioning of the recording operation of the apparatus.

42. In bore hole surveying apparatus, consisting of an enclosed apparatus to be passed into a boring and comprising a light source element and a light-sensitive record element, time controlled means for repeatedly energizing the light element, and means responding to change of position of the apparatus to also control the energizing of the light element, both of said means being rendered operative by movement of the apparatus as a whole.

43. In a bore hole survey apparatus, comprising an outer water-tight casing enclosing a recording assembly including a recorder and record receiving member and means for operating such recorder, a support secured to the outer casing for maintaining the rotational position of the recording assembly with respect to a diameter of the said casing and an exterior surface of the casing extending in the direction of a diameter thereof to provide aligning means in known oriented relation with a member of said recording assembly.

44. In a bore hole survey apparatus, comprising an elongated outer water-tight casing enclosing a light-sensitive record member, a light source and an energy source for such light, a time controlled means for energizing the light at predetermined intervals, and a gravity actuated element supporting the record member and so connected to the said time controlled means as to render the same operative when the entire apparatus is in a normal upright working position.

45. In bore hole surveying apparatus comprising a water-tight casing adapted to be passed into and along a boring, and within the casing an inclination recording means, control mechanism to periodically actuate the said means to make a record of inclination, an audible signal device also within the casing and operable in definite timed relation with the recording means to give an indication of the time of operation of the said recording means, and means responsive to movement of the apparatus as a whole to initiate the functioning of the recording and signalling operation of the apparatus.

46. In bore hole survey apparatus comprising a water-tight casing adapted to be passed into a boring, within the casing an inclination recording means and control mechanism therefor to periodically actuate the said means to make a record of inclination, and an audible signal device also within the casing and operable in timed relation with the recording means to give an indication of the time of actuation of the said recording means.

47. In a bore hole surveying apparatus for recording inclinations of a boring, comprising an elongated casing to be passed into a boring, a recording means and operating means therefor mounted within said casing, and means responsive to tilting movement of the survey apparatus as a whole to initiate the functioning of the recording operation of the apparatus.

Signed at Chicago, county of Cook, and State of Illinois, this 23rd day of August, 1924.

ALEXANDER ANDERSON.